United States Patent
Seo et al.

(10) Patent No.: US 11,921,288 B2
(45) Date of Patent: Mar. 5, 2024

(54) DISPLAY APPARATUS PROVIDING EXPANDED VIEWING WINDOW

(71) Applicant: SAMSUNG ELECTRONICS CO., LTD., Suwon-si (KR)

(72) Inventors: Wontaek Seo, Yongin-si (KR); Hongseok Lee, Seoul (KR); Sunil Kim, Seoul (KR); Seokil Moon, Suwon-si (KR); Bongsu Shin, Seoul (KR); Daeho Yang, Suwon-si (KR); Changkun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 290 days.

(21) Appl. No.: 17/327,281

(22) Filed: May 21, 2021

(65) Prior Publication Data

US 2022/0171186 A1    Jun. 2, 2022

(30) Foreign Application Priority Data

Dec. 2, 2020    (KR) .......................... 10-2020-0166939

(51) Int. Cl.
   *G02B 27/01*    (2006.01)
   *G02B 26/08*    (2006.01)
   (Continued)

(52) U.S. Cl.
   CPC ..... *G02B 27/0101* (2013.01); *G02B 26/0833* (2013.01); *G02B 27/0093* (2013.01); *G02B 27/30* (2013.01); *G02B 2027/014* (2013.01)

(58) Field of Classification Search
   CPC ............ G02B 27/0101; G02B 26/0833; G02B 27/0093; G02B 27/30; G02B 2027/014;
   (Continued)

(56) References Cited

U.S. PATENT DOCUMENTS 9,442,294 B2    9/2016  Urey
2002/0176127 A1    11/2002  Garner
(Continued)

FOREIGN PATENT DOCUMENTS

JP    6286781 B2    3/2018

OTHER PUBLICATIONS

Kreis et al., "Hologram reconstruction using a digital micromirror device," Optical Engineering, vol. 40 No. 6, pp. 926-933, Jun. 2001.
(Continued)

*Primary Examiner* — Darryl J Collins
*Assistant Examiner* — Matthew Y Lee
(74) *Attorney, Agent, or Firm* — Sughrue Mion, PLLC

(57) ABSTRACT

A display device includes a light source array including a plurality of light sources where at least one of the plurality of light sources is selectively driven, a spatial light modulator for modulating light from the light source array to form image light, a focusing optical system for focusing the image light formed by the spatial light modulator at a position in a predetermined eye box, a micro mirror array arranged in an optical path formed in the focusing optical system and including a plurality of mirror cells. The plurality of mirror cells are controlled to be in an ON state in that light is reflected in a direction toward an inside of the eye box or to be in an OFF state in that light is reflected in a direction toward an outside of the eye box.

20 Claims, 16 Drawing Sheets

(51) Int. Cl.
*G02B 27/00* (2006.01)
*G02B 27/30* (2006.01)

(58) Field of Classification Search
CPC ........ G02B 2027/0178; G02B 27/0172; G02B 5/08; G02B 17/08; G02B 26/06; G02B 26/0816; G02B 27/283
See application file for complete search history.

(56) References Cited

U.S. PATENT DOCUMENTS

| | | | |
|---|---|---|---|
| 2015/0205111 A1* | 7/2015 | Border | G02B 5/003 345/8 |
| 2016/0037059 A1 | 2/2016 | Lim et al. | |
| 2016/0363770 A1* | 12/2016 | Kim | G02B 27/0093 |
| 2018/0003962 A1* | 1/2018 | Urey | G02B 27/0093 |
| 2018/0129166 A1 | 5/2018 | Seo et al. | |
| 2018/0143435 A1* | 5/2018 | Lee | G02B 30/35 |
| 2018/0182174 A1* | 6/2018 | Choi | G02B 27/0075 |
| 2018/0364482 A1* | 12/2018 | Georgiou | G02B 27/0101 |
| 2019/0146223 A1* | 5/2019 | Li | G02B 30/52 345/8 |
| 2019/0324272 A1 | 10/2019 | Seo et al. | |
| 2020/0088998 A1 | 3/2020 | Shin et al. | |
| 2020/0356053 A1 | 11/2020 | Seo et al. | |
| 2021/0247610 A1* | 8/2021 | Bhakta | G02B 6/0026 |
| 2022/0082831 A1 | 3/2022 | Seo et al. | |
| 2022/0201258 A1* | 6/2022 | Durban | H04N 9/3179 |

OTHER PUBLICATIONS

Huebschman et al., "Holographic video display using digital micromirrors," International Society for Optics and Photonics, Proceedings of SPIE vol. 5742, Practical Holography XIX: Materials and Applications, Apr. 21, 2005, Total 15 pages.

Molodtsov et al., "The possibility of using DMD SLM for hologram filters displaying in dispersive correlator," ELSEVIER, Science Direct, Physics Procedia, vol. 73, pp. 338-342, Jan. 2015.

Nesbitt et al., "Holographic recording using a digital micromirror device," International Society for Optics and Photonics, Proceedings of SPIE vol. 3637, Practical Holography XIII, Mar. 25, 1999, Total 10 pages.

Ding et al., "Shaping super-Gaussian beam through digital micromirror device," Science China, Physics, Mechanics & Astronomy, vol. 58, No. 3, Mar. 2015, Total 9 pages.

Zhu, "Dynamic digital holographic display based on digital micromirror device and the improvement of optically reconstructed image quality," https://www.youtube.com/watch?v=G-WBFbn_kKA, Series of The 8th International Symposium on Display Holography (ISDH 2009), Release Date 2012, Total 4 pages.

* cited by examiner

FIG. 9A

![Grid 4x4 with OFF in row 2 col 2 and OFF in row 3 col 4, labeled 151a, arrow A]

![Grid 4x4 with OFF in row 1 col 3 and OFF in row 4 col 1, labeled 151a, arrow A]

151a

DISPLAY APPARATUS PROVIDING EXPANDED VIEWING WINDOW

CROSS-REFERENCE TO RELATED APPLICATION

This application is based on and claims priority under 35 U.S.C. § 119 to Korean Patent Application No. 10-2020-0166939, filed on Dec. 2, 2020, in the Korean Intellectual Property Office, the disclosure of which is incorporated by reference herein in its entirety.

BACKGROUND

1. Field

The disclosure relates to display devices providing an expanded viewing window.

2. Description of the Related Art

A head mount display (HMD) is a display that is worn in front of the eyes like glasses to view images, and is currently being commercialized and widely applied in various fields, including the entertainment, medical, education, and industrial fields.

The HMD is applied to various applications providing virtual reality (VR), augmented reality (AR), or the like.

On the other hand, in HMDs, a plan to expand an area (a viewing window, an eye box, etc.) in which a user may observe images is continuously being sought.

SUMMARY

Provided are display devices providing an expanded viewing window.

Additional aspects will be set forth in part in the description which follows and, in part, will be apparent from the description, or may be learned by practice of the presented embodiments of the disclosure.

According to an aspect of the disclosure, there is provided a display device comprising: a light source array comprising a plurality of light sources; a spatial light modulator configured to modulate light from the light source array to form image light; a focusing optical system configured to focus the image light formed by the spatial light modulator at a first position in an eye box; a micro mirror array arranged in an optical path formed in the focusing optical system and comprising a plurality of mirror cells; and a processor configured to: selectively drive at least one light source among the plurality of light sources; control the spatial light modulator to modulate the light from the at least one light source to form the image light; and control one or more mirror cells of the plurality of mirror cells to be in an ON state in which the image light is reflected in a first direction toward the first position that is inside of the eye box or to be in an OFF state in which the image light is reflected in a second direction toward a second position that is outside of the eye box.

The processor may be further configured to control a first mirror cell, among the plurality of mirror cells, that corresponds to a first light source driven among the plurality of light sources to be in the ON state.

A distance between positions at which the image light from each of the plurality of light sources is focused in the eye box is greater than or equal to a pupil size.

A distance between positions at which the image light from each of the plurality of light sources is focused in the eye box is in a range from 2 mm to 10 mm.

The plurality of light sources may comprise light sources provided at different positions and wherein each of the plurality of light sources provide the light having a same wavelength band.

A distance between positions at which the image light from each of the plurality of light sources is focused in the eye box is less than a pupil size.

The processor may be further configured to: determine two light sources among the plurality of light sources as driving light sources, sequentially drive the two light sources, and control the spatial light modulator in synchronization with the driving light sources.

The focusing optical system may comprise a first lens and a second lens that are arranged in order in the optical path from the light source array to the eye box, and the micro mirror array is provided between the first lens and the second lens.

The display device may further comprise a collimating lens provided between the light source array and the spatial light modulator.

The micro mirror array may be provided at a third position of a focal plane of the first lens.

A size of each of the plurality of mirror cells is less than a size of a beam spot in which the image light is focused by the first lens.

Among the plurality of mirror cells, the processor may be further configured to control M mirror cells among N mirror cells located in a region where the beam spot reaches to be in the ON state, wherein M is a natural number less than N, and wherein N is a natural number greater than 1.

The processor may further configured to: determine a combination of a plurality of different sets of mirror cells, each of the plurality of different sets including the M mirror cells, and sequentially control the plurality of different sets.

The processor may be further configured to control each of the plurality of mirror cells to be in one of a plurality of ON states or the OFF state.

The display device may further comprise a beam splitter provided between the light source array and the spatial light modulator, and configured to direct the light from the light source array to the spatial light modulator, and direct the image light formed by the spatial light modulator to the micro mirror array.

The spatial light modulator may be of a reflective type.

The display device may further comprise an optical combiner provided between the beam splitter and the eye box, the optical combiner configured to combine the image light formed by the spatial light modulator with the light from an environment to be directed toward the eye box.

The display device may further comprise an eye tracking sensor, wherein the processor may be further configured to select a driving light source from among the plurality of light sources based on a detection signal from the eye tracking sensor.

The processor may be further configured to select a driving light source from among the plurality of light sources according to an input from a user.

The display device may be a wearable device.

According to another aspect of the disclosure, there is provided a display device comprising: a memory storing one or more instructions, and a processor configured to execute the one or more instructions to: selectively drive at least one light source among a plurality of light sources; control a spatial light modulator to modulate the light from the at least one light source to form an image light; and control one or more mirror cells, among a plurality of mirror cells of a micro mirror array, to be in an ON state in which the image light is reflected in a first direction toward a first position that is inside of an eye box or to be in an OFF state in which the image light is reflected in a second direction toward a second position that is outside of the eye box, the micro mirror array being arranged in an optical path formed in a focusing optical system that focuses the image light formed by the spatial light modulator at the first position in the eye box.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 9A and 9B illustrate mirror cell driving for forming an image in which speckles are removed in an example embodiment of FIG. 8;

DETAILED DESCRIPTION

Figure 1:
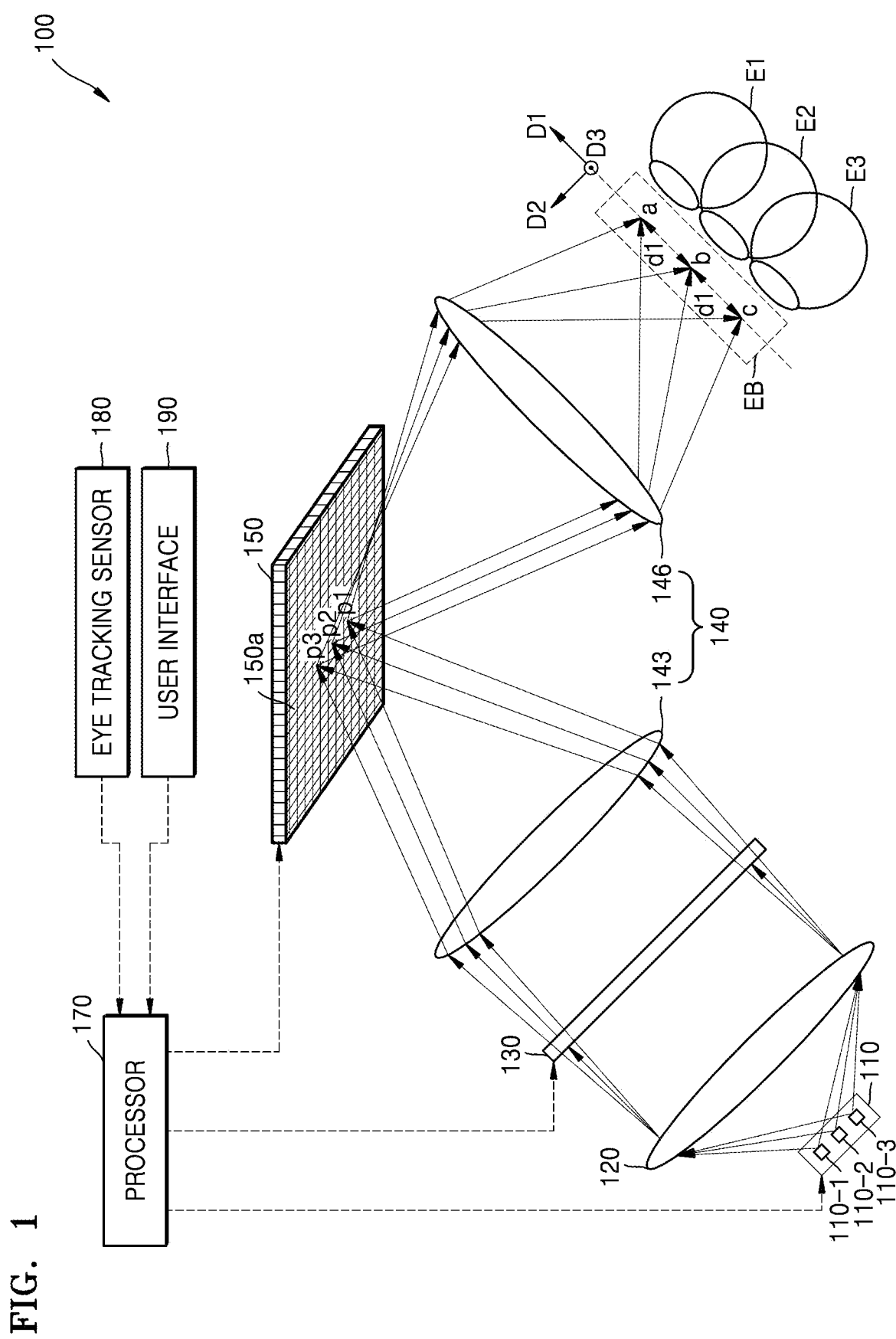
FIG. 1 is a configuration diagram illustrating an optical arrangement of a display device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of the disclosure will be described in detail with reference to the accompanying drawings. In the following drawings, the same reference numerals refer to the same components, and the size of each component in the drawings may be exaggerated for clarity and convenience of description. Meanwhile, example embodiments described below are merely exemplary, and various modifications may be made from these embodiments.

Hereinafter, what is described as "above" or "on" may include what is directly on with contact, as well as what is on without contact.

Singular expressions may include plural expressions unless the context clearly indicates otherwise. When a part "includes" a certain component, it means that other components may be further included rather than excluding other components unless specifically stated to the contrary.

The use of the term "said" and similar indicating terms may correspond to both the singular and the plural.

For steps constituting a method, if there is no explicit order or contradictory statement, the steps may be performed in an appropriate order. The steps are not necessarily limited to the order of description of the steps. The use of all examples or illustrative terms (for example, etc.) is merely for describing in detail the technical idea, and the scope is not limited by the above examples or illustrative terms unless limited by the claims.

Figure 2A:
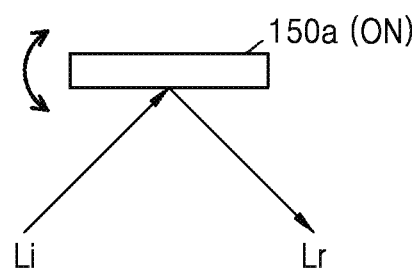
FIGS. 2A and 2B conceptually illustrate on/off driving of a mirror cell constituting a micromirror array provided in the display device of FIG. 1.
Figure 2B:
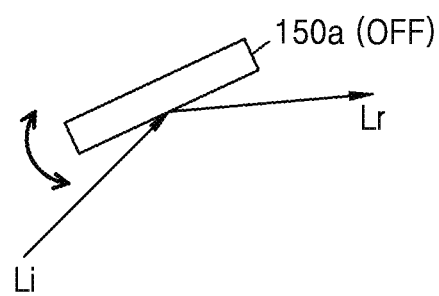

FIG. 1 is a schematic diagram illustrating an optical arrangement of a display device according to an example embodiment, and FIGS. 2A and 2B conceptually illustrate on/off driving of a mirror cell constituting a micro mirror array provided in the display device of FIG. 1.

Referring to FIG. 1, a display device 100 may include a light source array 110, a spatial light modulator 130 that modulates light from the light source array 110 to form image light, a focusing optical system 140 that focuses the image light formed by the spatial light modulator 130 on a position within an eye box EB, a micro mirror array 150 that is provided in an optical path formed by the focusing optical system 140 and controls a direction in which the light is reflected. The display device 100 may also include a processor 170 that controls the light source array 110, the spatial light modulator 130, and the micro mirror array 150. According to an example embodiment, the eye box EB may be predetermined.

The light source array 110 may include a plurality of light sources 110-1, 110-2, and 110-3. The light from the plurality of light sources 110-1, 110-2, and 110-3 may form a focal point at different positions within the eye box EB, and at least one of the plurality of light sources 110-1, 110-2, and 110-3 may be selectively driven. This will be described later with reference to FIGS. 4A to 4C.

As the light sources 110-1, 110-2, 110-3, a light emitting diode (LED), a laser diode (LD), an organic light emitting diode (OLED), a vertical cavity surface emitting laser (VCSEL), etc. may be used. When the display device 100 is a holographic display device, light having high coherence, such as a laser, may be used as the light sources 110-1, 110-2, and 110-3, or any other light source that may provide light having spatial coherence with a certain level or higher to the spatial light modulator 130 may be used.

The light source array 110 may include the plurality of light sources 110-1, 110-2, and 110-3 spaced apart from each other, to form the focal point at a plurality of different positions from each other within the eye box EB, and therefore, the same image to be recognized at the plurality of positions, respectively. This may be conceptually different from simply having light sources that provide lights of different wavelengths from each other. In other words, the light source array 110 may include light sources that provide lights with the same wavelength band at different positions. The light sources 110-1, 110-2, and 110-3 may be configured so that the wavelength band of light provided by the light source 110-1, the wavelength band of light provided by the light source 110-2, and the wavelength band of the light provided by the light source 110-3 are the same. In FIG. 1, each of the light sources 110-1, 110-2, and 110-3 is illustrated as being one, but is not limited thereto. For instance, according to another example embodiment, each of the light sources 110-1, 110-2, and 110-3 may include an array of a plurality of lasers or an array of a plurality of light emitting diodes.

Each of the light sources 110-1, 110-2 and 110-3 may include lights of different wavelength bands. That is, the light source 110-1 may include light-emitting elements that provide lights of red (R), green (G), and blue (B) wavelength bands, and the light source 110-2 may also include light-emitting elements that provide lights of red (R), green (G), and blue (B) wavelength bands in order to provide lights of the same wavelength bands as the light source 110-1. The light source 110-3 may also include light-emitting elements that provide lights of red (R), green (G), and blue (B) wavelength bands.

According to an example embodiment, the processor 170 may control selective driving among the plurality of light sources 110-1, 110-2 and 110-3.

The spatial light modulator 130 may modulate lights from the light sources 110-1, 110-2 and 110-3 according to image signals. When the processor 170 selects and drives one or more of the plurality of light sources 110-1, 110-2, and 110-3, the processor 170 may control a modulating signal that is applied to the spatial light modulator 130 in synchronization with a driving light source.

A collimating lens 120 may be between the light source array 110 and the spatial light modulator 130 to collimate lights from the light source array 110 toward the spatial light modulator 130.

The spatial light modulator 130 may form a hologram pattern by diffracting and modulating incident light according to a hologram data signal. The spatial light modulator 130 may include any of a phase modulator for performing only phase modulation, an amplitude modulator for performing only amplitude modulation, and a composite modulator for performing both phase modulation and amplitude modulation. Although the spatial light modulator 130 is shown in a transmission-type in FIG. 1, a reflective-type spatial light modulator may be also used. In the case of the transmission-type, the spatial light modulator 130 may use, for example, a semiconductor modulator based on a compound semiconductor such as GaAs, or a liquid crystal device (LCD). In the case of the reflective-type, the spatial light modulator 130 may use, for example, a digital micromirror device (DMD), a liquid crystal on silicon (LCoS), or a semiconductor modulator.

The focusing optical system 140 may focus the image formed by the spatial light modulator 130 on a predetermined space. The focusing optical system 140 may include a first lens 143 and a second lens 146. However, the focusing optical system 140 is not limited thereto. The focusing optical system 140 may be configured as a Maxwellian view optical system that collects image information at one point in a pupil and then scans the point to a retina.

The micro mirror array 150 may be between the first lens 143 and the second lens 146. The micro mirror array 150 may be disposed at a position of a focal plane of the first lens 143. The micro mirror array 150 may include a plurality of mirror cells 150a, each of which is controlled to rotate. As the micro mirror array 150, a DMD may be used. Each of the mirror cells 150a may be rotationally driven and may be controlled to be in an ON state in which incident light is directed toward an inside of the eye box EB, or to be in an OFF state in which the incident light is directed toward an outside of the eye box EB, that is, the incident light is directed out of view. According to an example embodiment, the processor 170 may control each of the mirror cells 150a to rotate in a desired manner.

As shown in FIG. 2A, the mirror cell 150a to be driven in the ON state may reflect the incident light Li in a direction toward the eye box EB. That is, the direction of reflected light Lr may be a direction in which the reflected light Lr may reach the inside of the eye box EB via the second lens 146.

Referring to FIG. 2B, the mirror cell 150a in the OFF state prevents the direction of reflecting the incident light Li from facing the eye box EB. That is, the direction of the reflected light Lr may be a direction such that the reflected light Lr does not enter the second lens 146 or does not reach the eye box EB through the second lens 146.

According to an example embodiment, the ON/OFF control of each of the mirror cells 150a may be interlocked with the driving light source in the light source array 110. Among the plurality of mirror cells 150a, the mirror cell 150a corresponding to a position at which the light from the driving light source reaches the micro mirror array 150 may be driven to be in the ON state, and thus may direct the light to a position within the eye box EB. Mirror cells 150a in different positions may be driven to be in the OFF state. That is, when the light source 110-1 is the driving light source, the mirror cell 150a corresponding to a position p1 on the micro mirror array 150 may be controlled to be in the ON state, and then the image light may be focused on a focal point a in the eye box EB. When the light source 110-2 is the driving light source, the mirror cell 150a corresponding to a position p2 on the micro mirror array 150 may be controlled to be in the ON state, and then the image light may be focused on a focal point b in the eye box EB. When the light source 110-3 is the driving light source, the mirror cell 150a corresponding to a position p3 on the micro mirror array 150 may be controlled to be in the ON state, and then the image light may be focused on a focal point c in the eye box EB.

The eye box EB may be defined to be in a predetermined range in which lights generated by each of the plurality of light sources 110-1, 110-2, and 110-3 provided in the light source array 110 form the focal points. The user may recognize an image through the light that reaches the eye box EB. In FIG. 1, a plurality of focal points a, b, and c and the eye box EB are shown to be outside the pupils of the user's eyes E1, E2, and E3, but this is for convenience of illustration. Each of the focal points a, b, and c may be formed at positions within the pupils.

A separation direction between the focal points a, b, and c is indicated by D1, which is a direction perpendicular to an optical axis direction D2 of the second lens 146. The plurality of light sources 110-1, 110-2, and 110-3 may be disposed where a separation distance d1 between the focal points a, b, and c is similar to or greater than the pupil size. However, this is exemplary, and in another embodiment, the separation distance between the plurality of focal points a, b, and c may be less than the pupil size. The distance d1 may be approximately 2 mm or more. The distance d1 may be approximately 4 mm or more and 10 mm or less.

The display device 100 may further include an eye tracking sensor 180 and/or a user interface 190. The processor 170 may select the driving light source from among the plurality of light sources 100-1, 100-2, and 100-3 based on a detection signal from the eye tracking sensor 180. Alternatively, the processor 170 may select the driving light source from among the plurality of light sources 100-1, 100-2, and 100-3 according to a user's input signal.

An operation of the display device 100 forming the image will be described as follows. Hereinafter, it will be described that the display device 100 is a holographic display device, but this is exemplary and not limited thereto.

The hologram data signal may be generated by the processor 170 and provided to the spatial light modulator 130. The hologram data signal may be a computer generated hologram (CGH) signal that is calculated to reproduce a hologram image to be targeted on a space. The processor 170 may generate the hologram data signal according to the hologram image to be reproduced. The spatial light modulator 130 may form the hologram pattern on a surface of the spatial light modulator 130 according to the hologram data signal provided from the processor 170. A principle that the spatial light modulator 130 forms the hologram pattern may be the same as the principle that a display panel displays the image, for example. For example, the hologram pattern may be displayed in the spatial light modulator 130 in the form of an interference pattern having information of the hologram image to be reproduced.

At the same time, the light source that is selected as the driving light source from among the light sources 110-1, 110-2, and 110-3 may provide the light to the spatial light modulator 130. The incident light on the spatial light modulator 130 may be diffracted and interfered by the hologram pattern formed in the spatial light modulator 130 and may be modulated into the image light. The image light may pass through the focusing optical system 140 and the micro mirror array 150 and may be focused at a predetermined focal point position in the eye box EB, whereby the hologram image having a three-dimensional effect may be reproduced in a predetermined space in front of the user's eyes. A shape and depth of the reproduced hologram image may be determined according to the hologram pattern to be formed by the spatial light modulator 130.

Because the light sources 110-1, 110-2, and 110-3 are arranged to form focal points at different positions on the focal plane close to the user's eyes E1, E2 and E3 that may be in various positions, an appropriate light source may be selected according to a position of the user's eyes, and thus, a range in which the user may observe the image, that is, a viewing window, may be enlarged.

The plurality of light sources 110-1, 110-2, and 110-3 are illustrated as three, but these are exemplary and are not limited thereto. For example, a larger number of light sources may be provided, and the plurality of light sources may be arranged in a two-dimensional array. In this case, the plurality of focal points in the eye box EB may be arranged in a direction D1 as well as in a direction D3, and a viewing range may be expanded in two dimensions.

Figure 3A:
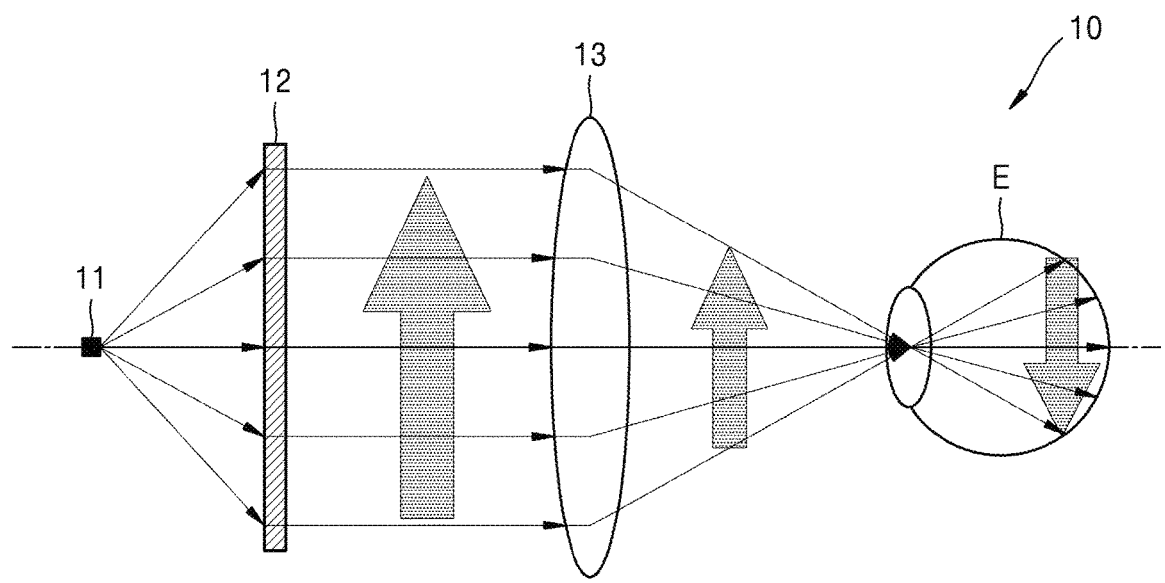
FIGS. 3A and 3B illustrate optical arrangements of display devices according to comparative examples, and each illustrate a case in which a user's eye position is different.
Figure 3B:
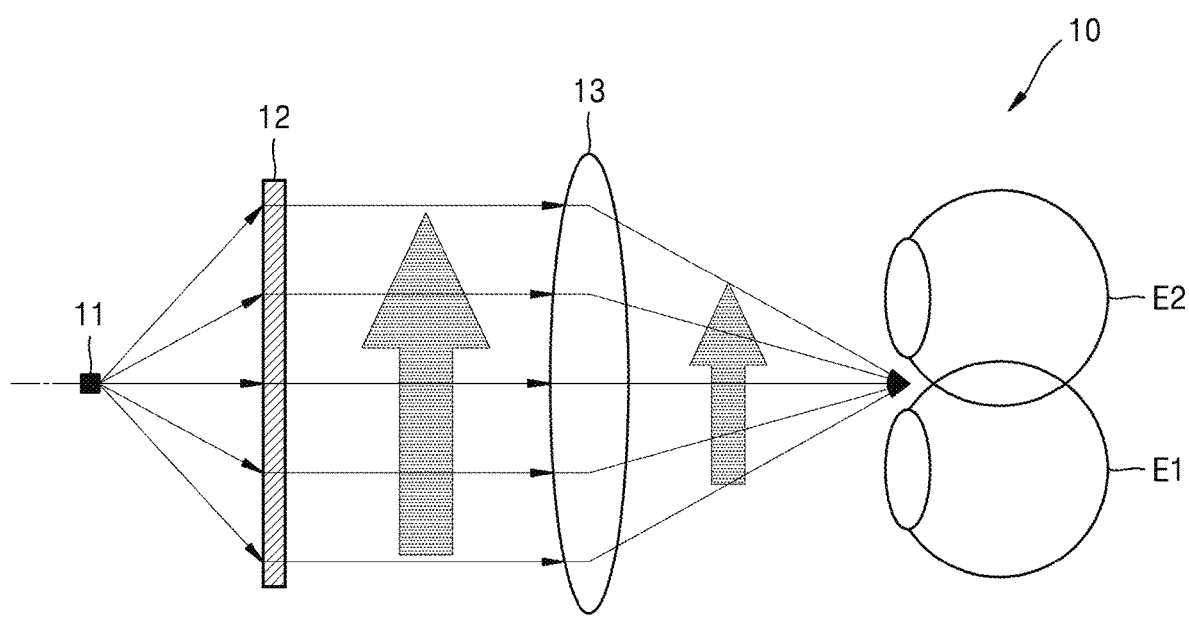

FIGS. 3A and 3B illustrate optical arrangements of display devices according to comparative examples, and each illustrate a case in which the user's eye position is different.

The display device 10 according to the comparative examples shown in FIGS. 3A and 3B includes a light source 11 that provides light, a spatial light modulator 12 that modulates light from the light source 11 according to image information, and a focusing optical system 13 that focuses the light modulated by the spatial light modulator 12 on a predetermined space.

The focusing optical system 13 may be configured as a Maxwellian view optical system. With such an optical system, images may be collected at one point in the pupil of a user's eye E and then scanned into the retina, and an image with high luminance may be provided without depending on the user's vision.

However, as shown in FIG. 3B, when a point containing image information may not enter the pupil (i.e., neither user's eye E1 nor user's eye E2) according to the position of the user's eye, the user may not recognize the image.

However, the display device 100 according to the example embodiment may employ an optical system that may form a plurality of focal points near the pupil in order to widen an area in which the image may be observed.

Figure 4A:
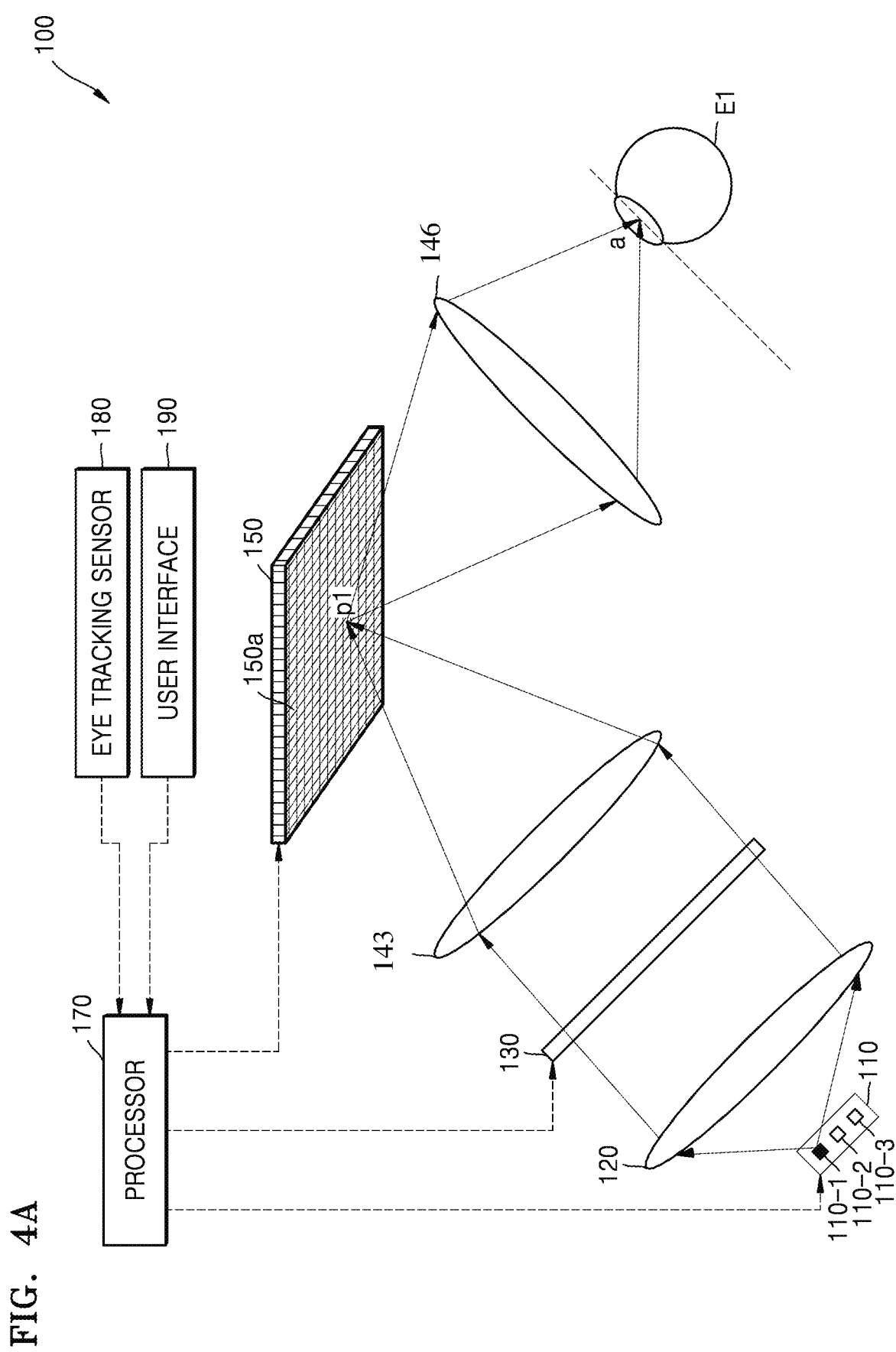
FIGS. 4A to 4C illustrate that driving light sources are selected differently according to a user's eye position in the display device of FIG. 1.
Figure 4B:
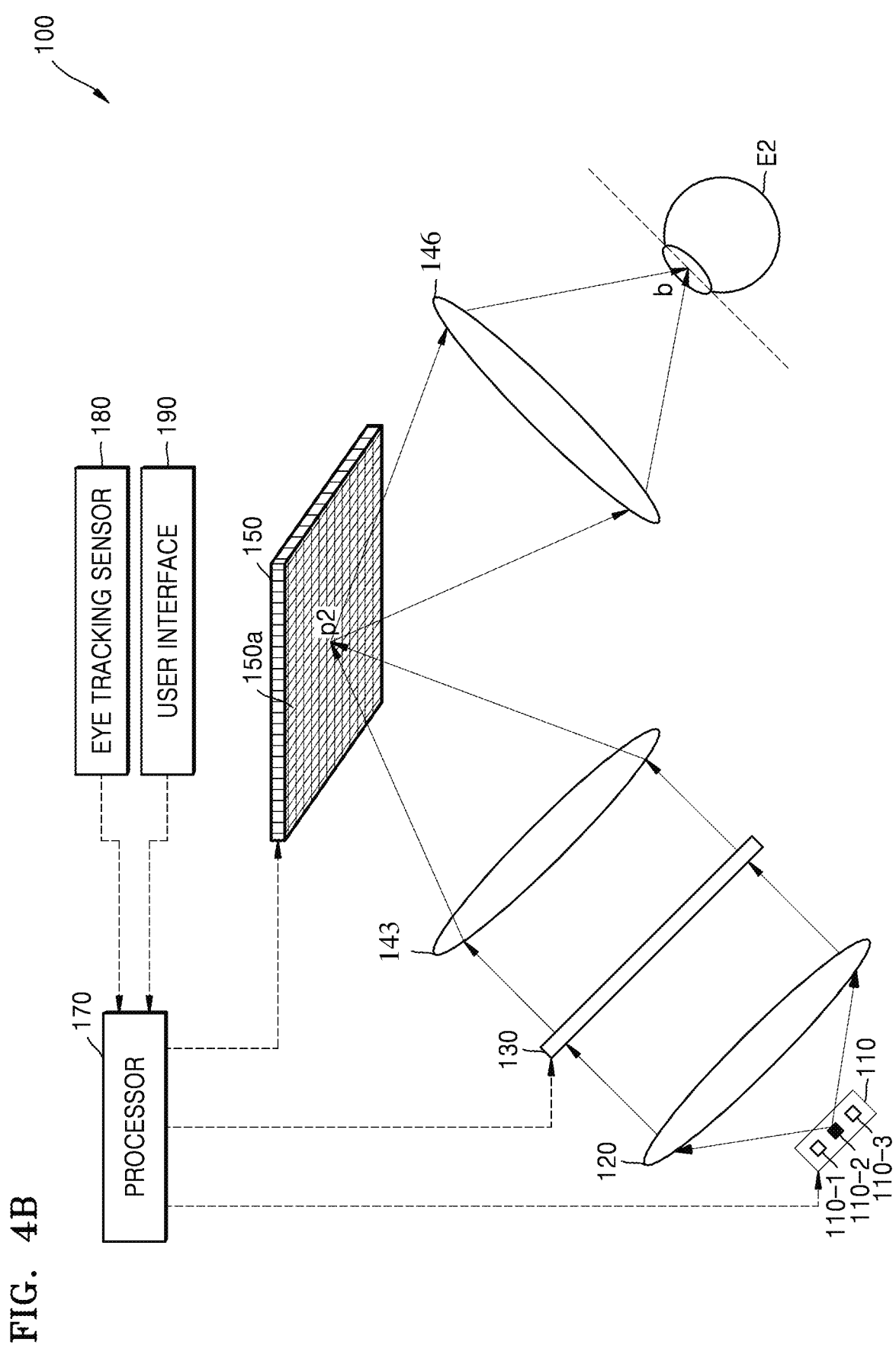
Figure 4C:
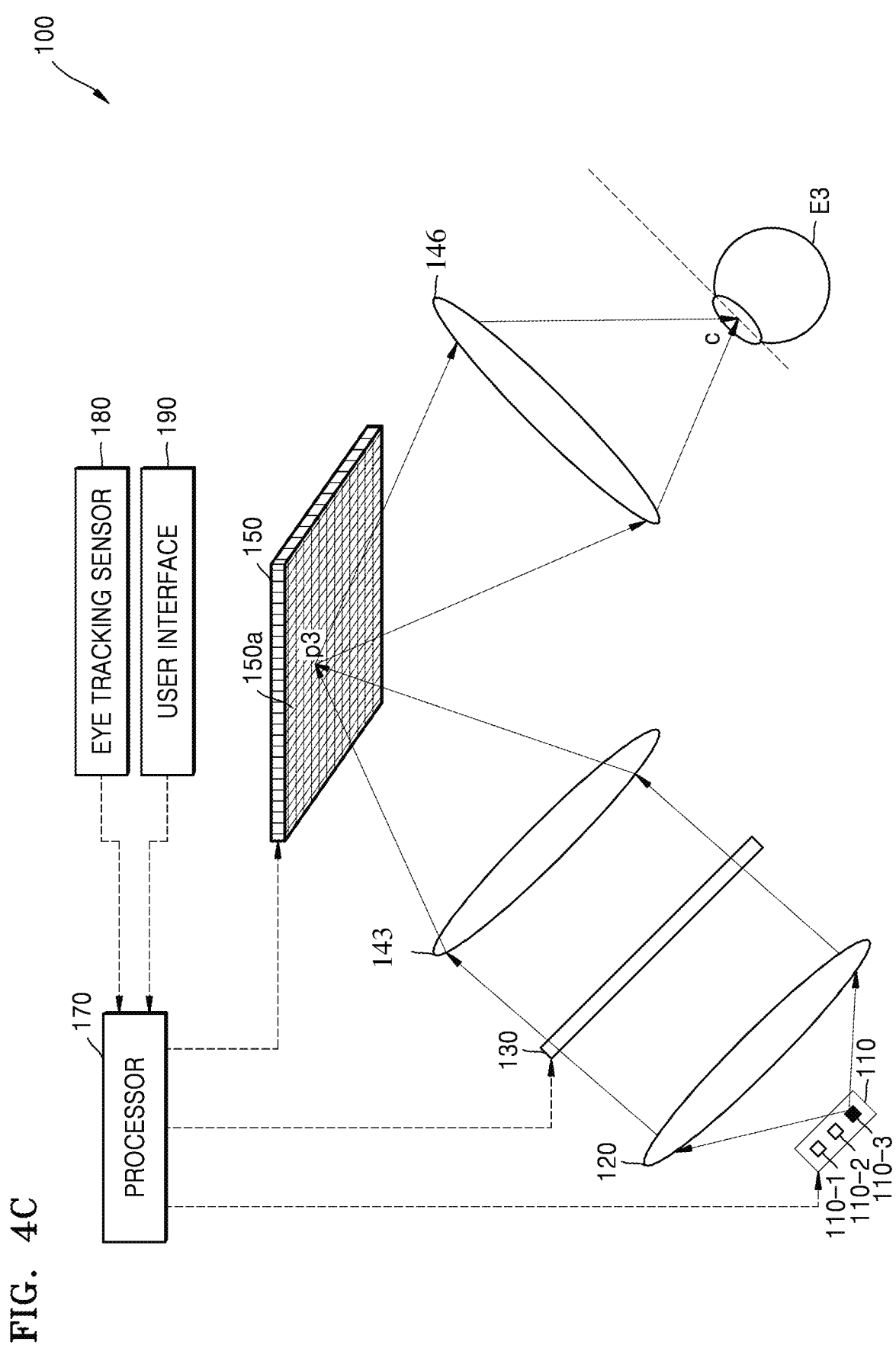

FIGS. 4A to 4C illustrate that driving light sources are selected differently according to a user's eye position in the display device of FIG. 1.

As described in FIG. 1, the light sources 110-1, 110-2, and 110-3 may be arranged to form different focal points a, b, and c that are spaced apart from each other, in a predetermined eye box EB near the user's eye. The light source that forms the focal point that may provide the clearest image in the relationship with the user's eyes E1, E2, and E3 that may be in different positions, among the focal points a, b, and c that are in these different positions, may be selected as the driving light source.

As shown in FIG. 4A, the light source 110-1 that forms the focal point a at a position closest to the user's eye E1 may be selected as the driving light source. That is, the light sources 110-2 and 110-3 may be in the OFF state and only the light source 110-1 may be in the ON state, and thus the image may be formed using the light from the light source 110-1.

Referring to FIG. 4B, the light source 110-2 that forms the focal point b at a position closest to the user's eye E2 may be selected as the driving light source. That is, the light sources 110-1 and 110-3 may be in the OFF state and only the light source 110-2 may be in the ON state, and thus the image may be formed using the light from the light source 110-2.

Referring to FIG. 4C, the light source 110-3 that forms the focal point c at a position closest to the user's eye E3 may be selected as the driving light source. That is, the light sources 110-1 and 110-2 may be in the OFF state and only the light source 110-3 may be in the ON state, and thus the image may be formed using the light from the light source 110-3.

Figure 5:
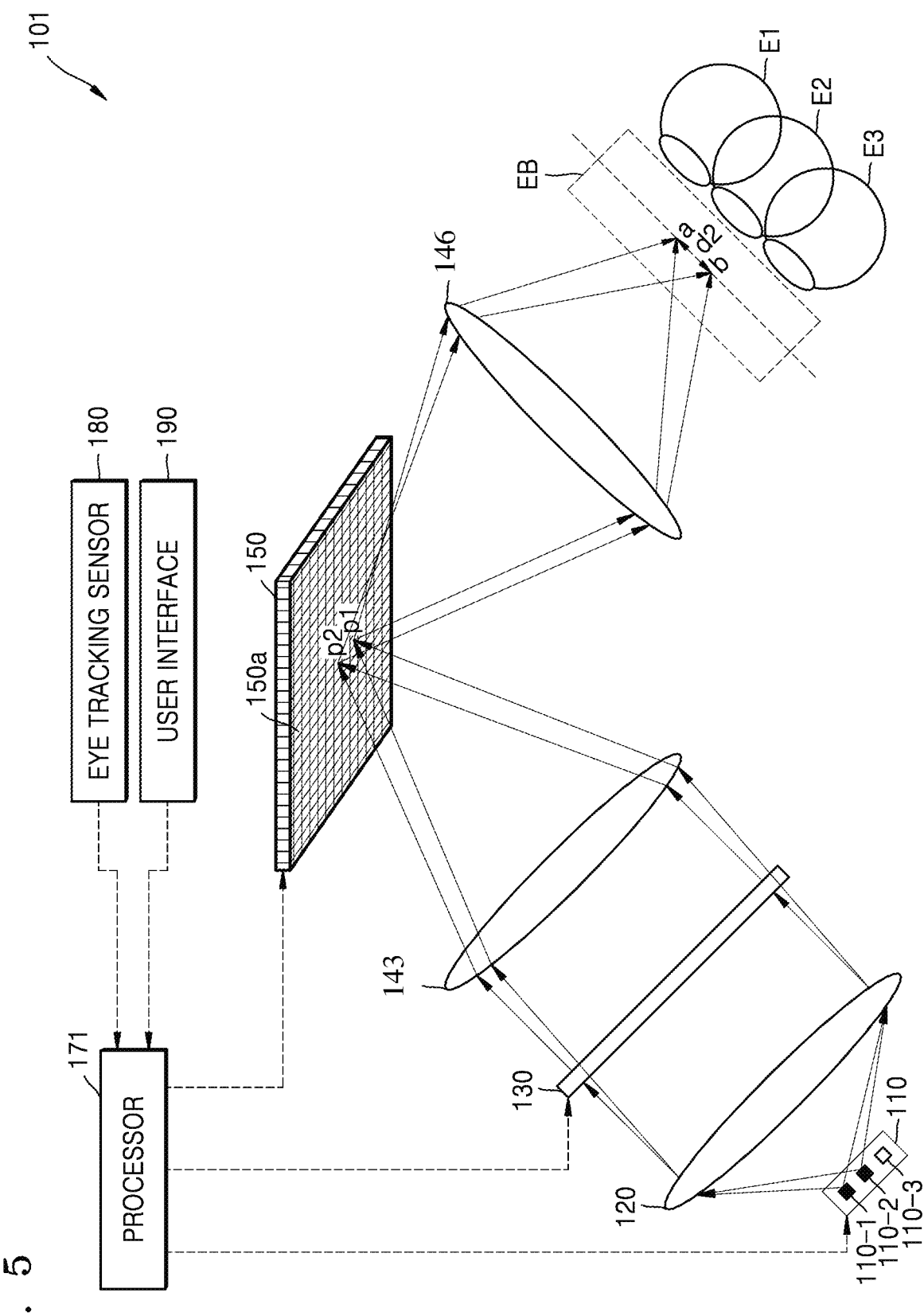
FIG. 5 is a configuration diagram illustrating an optical arrangement of a display device according to another example embodiment.

FIG. 5 is a configuration diagram illustrating an optical arrangement of a display device according to another example embodiment.

In a display device 101, a distance d2 between the plurality of focal points a, b, and c may be less than the pupil size. The distance d2 may be approximately 6 mm or less. The distance d2 may be approximately 2 mm or more and 10 mm or less. Since, in this case, two focal points may correspond to one pupil and accordingly, a double image may be recognized by the user, a driving that may prevent the double image may be required. In addition, as shown in FIG. 1, when the distance d1 between the plurality of focal points a, b, and c is set greater than the general pupil size, the same driving as the display device 101 may be required depending on individual differences.

When two focal points correspond to one pupil, a processor 171 may select two of the light sources 110-1, 110-2, and 110-3 as the light source according to a detection signal from the eye tracking sensor 180. Alternatively, because the images at the moment when the two focal points are formed may be clearly recognized, the processor 171 may drive two of the light sources 110-1, 110-2, and 110-3 as the light source according to the user's selection. However, when the two selected light sources operate at the same time, the user may recognize a double image. Accordingly, the processor 171 may sequentially drive the two selected driving light sources and control the spatial light modulator 130 to provide a parallax image suitable for a corresponding focal point position at the moment when each light source is turned on. The operation in which the two selected driving light sources are sequentially driven may operate at about 40 Hz or more so that the user does not recognize flicker.

As shown, when both focal points a and b correspond to the pupil of the user's eye E2, the light sources 110-1 and 110-2 may be selected as the driving light sources according to the user's selection or the detection signal from the eye tracking sensor 180. In this case, the light source 110-3 may maintain the OFF state and the light sources 110-1 and 110-2 may flicker sequentially, and the light therefrom may be modulated by the spatial light modulator 130.

At a predetermined moment, the light source 110-1 may be turned on and in synchronization therewith, the spatial light modulator 130 may modulate the light from the light source 110-1 and then the focal point a may be formed. At the next moment, the light source 110-1 may be turned off and the light source 110-2 may be turned on, and in synchronization therewith, the spatial light modulator 130 may modulate the light from the light source 110-2 and then the focal point b may be formed. That is, the formation of the focal points a and b shown in the drawing may occur in a time sequence. When an operation period is set to about 40 Hz or more, the user may not recognize flickering of the two light sources 110-1 and 110-2, and also different parallax images suitable for the two focal point positions may be provided, so that the user may recognize a clear image, not a double image. FIG. 5 illustrates that the light sources 110-1 and 110-2 are selected as the driving light sources, but this is illustrative and not limited thereto. The plurality of different light sources may be selected as the driving light source according to the position of the user's pupil.

The display devices 100 and 101 according to the example embodiments may also provide the image with less noise, and this will be described as follows.

Figure 6:
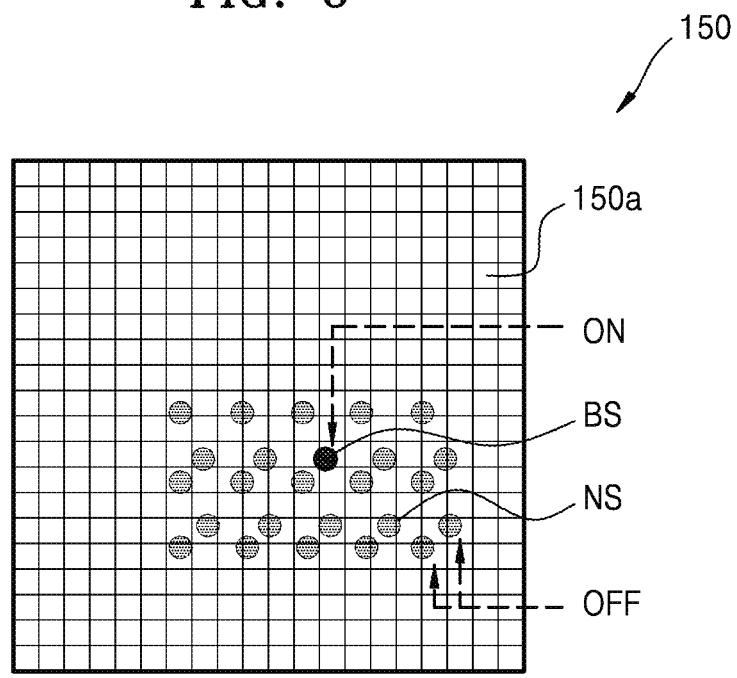
FIG. 6 conceptually illustrates that noise spots reaching a micro mirror array of a display device according an example embodiment are removed.
Figure 7:
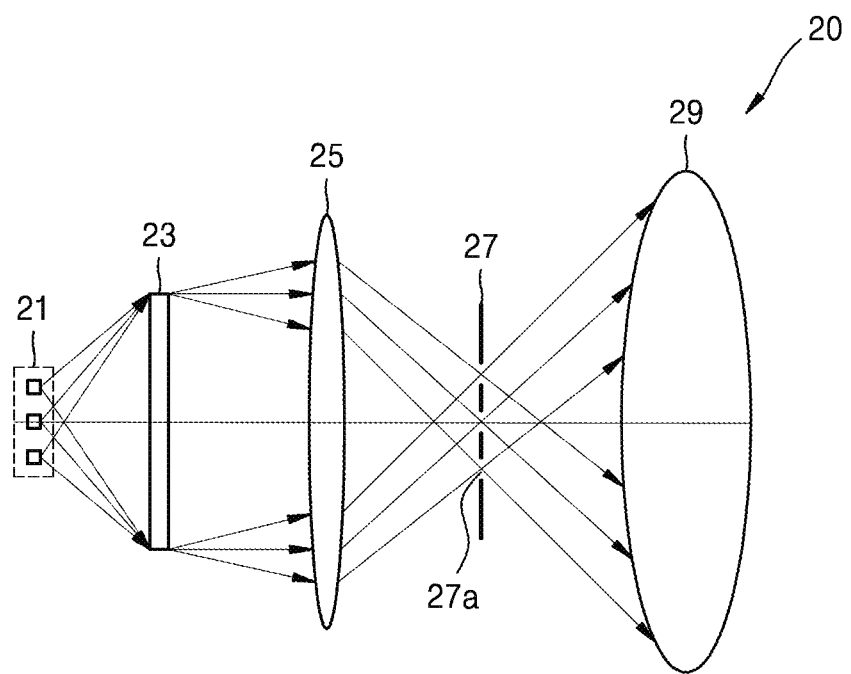
FIG. 7 illustrates a configuration for removing noise spots in a display device according to a comparative example.

FIG. 6 conceptually illustrates that noise spots reaching a micro mirror array of a display device according an example embodiment are removed. FIG. 7 illustrates a configuration for removing noise spots in a display device according to a comparative example.

Referring to FIG. 6, a plurality of spots may arrive at the micro mirror array 150. The rest of the spots may be noise spots NS, except for one beam spot BS. The noise spots NS may be noise generated when the light is modulated by the spatial light modulator 130. The spatial light modulator 130 may be composed of an array of a plurality of pixels, and thus, the array of the plurality of pixels may act as a grid. Therefore, for example, when the spatial light modulator 130 has the hologram pattern for forming the hologram image, the incident light may be diffracted and interfered not only by the hologram pattern, but also by a pixel grid composed of the array of pixels of the spatial light modulator 130. In addition, some of the incident light may not be diffracted by the hologram pattern and pass through the spatial light modulator 130 as it is. As a result, when the hologram image is focused on the micro mirror array 150 by the first lens 143, a plurality of lattice spots may appear as the noise spots NS. When the plurality of grid spots reach the eye box EB, the plurality of grid spots may act as image noise that deteriorates image quality.

However, in the micro mirror array 150 employed in the example embodiment, the mirror cell 150a at the position of the beam spot BS containing the image light may be controlled to be in the ON state, and the mirror cell 150a at the remaining positions including the positions where the noise spots NS reach, may be controlled to be in the OFF state. The positions where the beam spots BS reach the micro mirror array 150 may be determined in connection with the driving light source selected from the light source array 110, and thus, the noise spots NS may not reach the eye box EB.

Meanwhile, referring to the configuration of the comparative example as shown in FIG. 7, a display device 20 may use a spatial filter 27 to block such noise. For instance, the display device 20 may include the first lens 25, the second lens 29, and the spatial filter 27 disposed between the two lenses may be adopted so that the grid spot formed in the spatial light modulator 130 does not reach the user's field of view. The display device 20 may include a light source 21 and spatial light modulator 23.

The spatial filter 27 may block the grid spot and a complex conjugate image and pass only the hologram image, and may include a plurality of openings 27a for passing through a plurality of hologram images. The number of openings 27a may need to be greater than the number of light sources, and an opening/closing driving of each opening may be required depending on the selection of the light sources.

In contrast, in the case of the example embodiment, in the micro mirror array 150 that controls the beam spot BS containing the image to be directed to the eye box EB, the noise spots NS may be basically controlled so that the noise spots NS are not directed to the eye box EB. In the case of an example embodiment, noise removal may be simpler and more effective than that of the comparative example.

Figure 8:
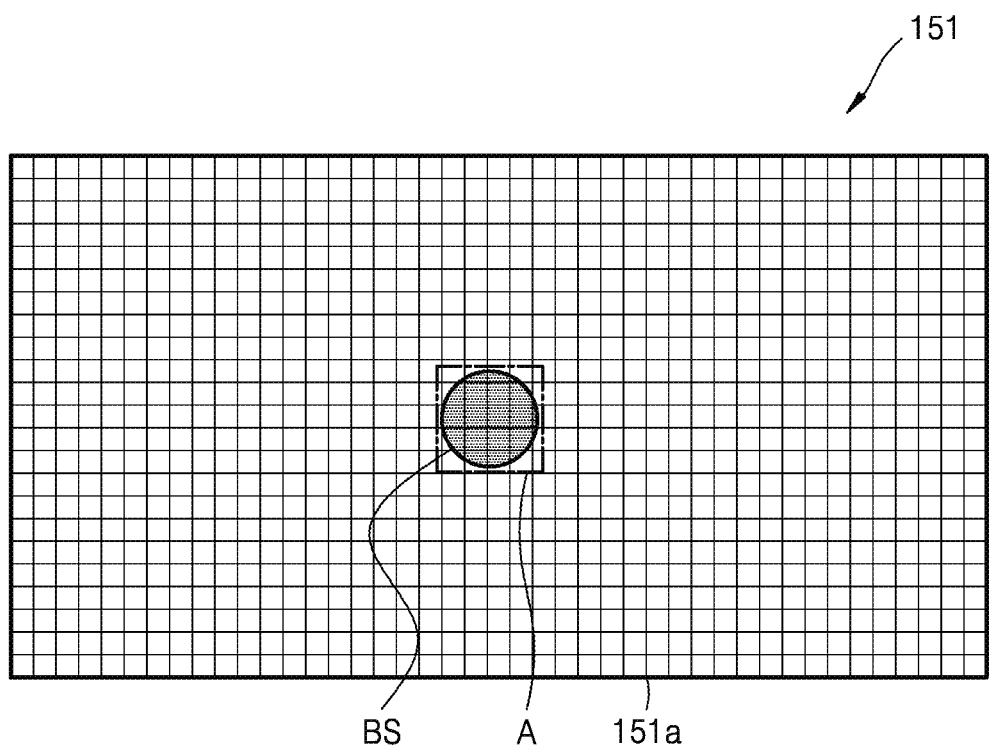
FIG. 8 illustrates that one beam spot reaches over a plurality of mirror cells in a micro mirror array provided in a display device according to another example embodiment.

FIG. 8 illustrates a scenario in which one beam spot reaches over a plurality of mirror cells in a micro mirror array provided in a display device according to another example embodiment. FIGS. 9A and 9B illustrate mirror cell driving for an image shape from which speckles are removed in the example embodiment of FIG. 8.

As illustrated in FIG. 8, the size of each of the plurality of mirror cells 151a provided in the micro mirror array 151 may be less than the size of the beam spot BS on which the image light is focused. An area of the mirror cells 151a where the beam spot BS reaches are indicated by A, and A may include 16 mirror cells 151a. However, this number is exemplary, and as such, according to another example embodiment, A may include a different number of mirror cells 151a.

In order to transmit the beam spot BS to a position in the eye box EB, the mirror cells 151a corresponding to A may be driven to be in the ON state. In this case, when the size of the beam spot BS is greater than the size of one mirror cell 151a, the driving for reducing speckle included in the beam spot BS may be possible. The speckle is a pattern of bright and dark spots generated according to the nature of the light source, and may be generated due to, for example, overlapping of different modes when driving a laser.

In order to reduce the speckle, not all the mirror cells 151a corresponding to A may be controlled to be in the ON state, and some of the mirror cells 151a may be controlled in the OFF state. Among the plurality of mirror cells 151a, M (M is a natural number less than N) mirror cells among N (N is a natural number greater than 1) mirror cells that are located in a region where the beam spot BS reaches may be controlled to be in the ON state. In this case, a combination of a plurality of different sets of mirror cells for selecting the M mirror cells may be set, and the plurality of sets may be sequentially controlled.

FIGS. 9A and 9B show a case in which two of the mirror cells 151a corresponding to A are turned off, and the mirror cells 151a at different positions are turned off. The driving of FIG. 9A and the driving of FIG. 9B may occur sequentially, and a beam spot formed by a combination of such driving may rarely include speckle.

In order to remove the speckle, although the number of mirror cells to be turned off is described as two, the number of mirror cells to be turned off is exemplary and may be changed differently. For example, the number of mirror cells to be turned off may be one or another number, and about half of the mirror cells 151a corresponding to A may be turned off. In addition, FIGS. 9A and 9B exemplarily show only two combinations, and the number of combinations may be two or more. In addition, the number of mirror cells to be turned off in each combination may be different from each other.

Figure 10:
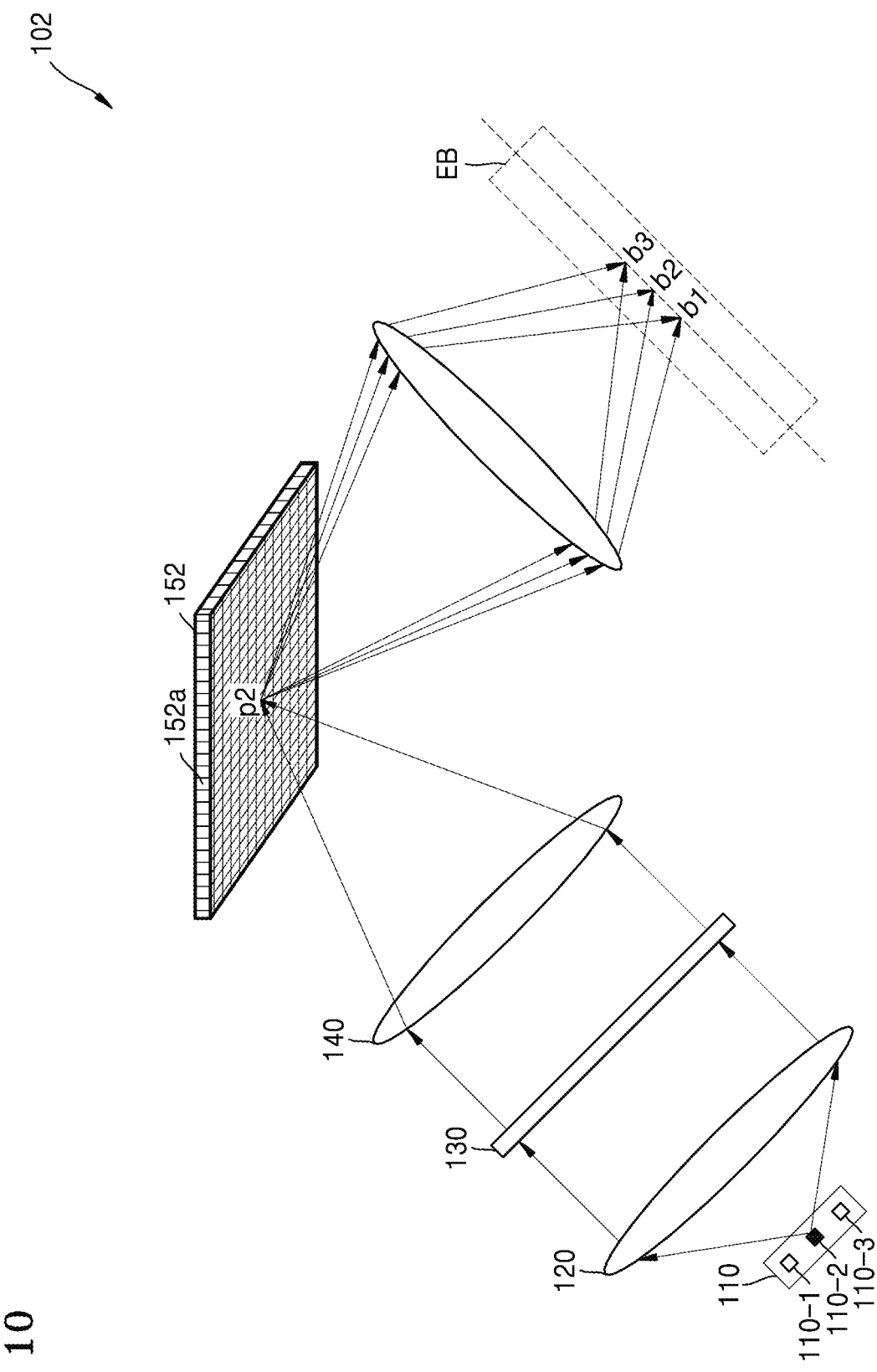
FIG. 10 is a configuration diagram illustrating an optical arrangement of a display device according to another example embodiment.

FIG. 10 is a configuration diagram illustrating an optical arrangement of a display device according to another example embodiment. FIGS. 11A to 11D conceptually illustrate on/off driving of a mirror cell constituting a micro mirror array provided in the display device of FIG. 10.

According to another example embodiment, a display device 102 of may differ from the display devices 100 and 101 described above in that the micro mirror array 152 may be driven in a plurality of states rather than two of on/off states.

Figure 11A:
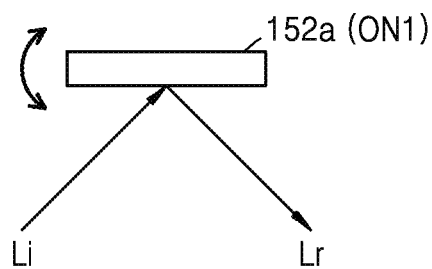
FIGS. 11A to 11D conceptually illustrate on/off driving of a mirror cell constituting a micro mirror array provided in the display device of FIG. 10.
Figure 11B:
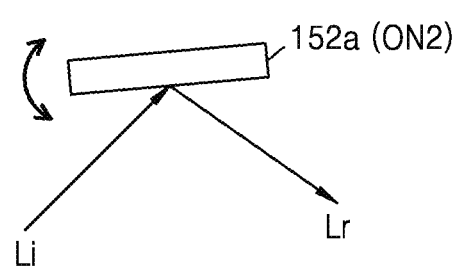
Figure 11C:
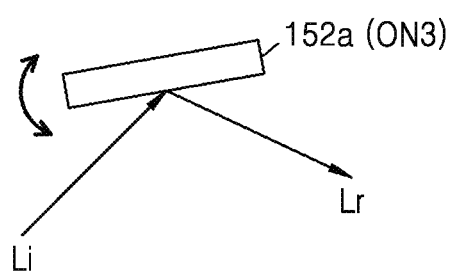
Figure 11D:
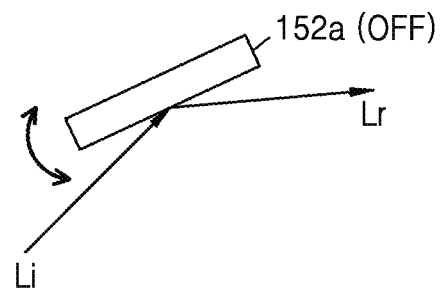

Each of the mirror cells 152a of the micro mirror array 152 may be controlled in either a plurality of ON states in which the reflected light Lr is directed to different positions inside the eye box EB as shown in FIGS. 11A to 11C, or the OFF state in which the reflected light Lr is directed outside the eye box EB as shown in FIG. 11D.

As shown in FIGS. 11A to 110, the mirror cell 152a may form three ON states with different rotation angles. The direction of the reflected light Lr shown in FIGS. 11A to 110 may be controlled to be directed to the focal points at different positions within the eye box EB.

The light from the light source 110-2 selected as the driving light source may be modulated by the spatial light modulator 130, then form the beam spot at the position p2 of the micro mirror array 152, and then form focal points at a plurality of positions b1, b2, and b3 in the eye box EB depending on the rotation angles of the mirror cell 152a at the position p2.

FIG. 10 shows that the image light from the light source 110-2 may be focused at different focal positions b1, b2, and b3 in the eye box EB according to the rotation angle of the mirror cell 152a, and another light source among the plurality of light sources 110-1, 110-2, and 110-3 may be selectively driven and thus the eye box EB may become wider.

Although FIGS. 11A to 11D illustrate that the mirror cell 152a is controlled in a plurality of rotation angles, this is exemplary, and the rotation angle may be controlled to be changed with a continuous value.

Figure 12:
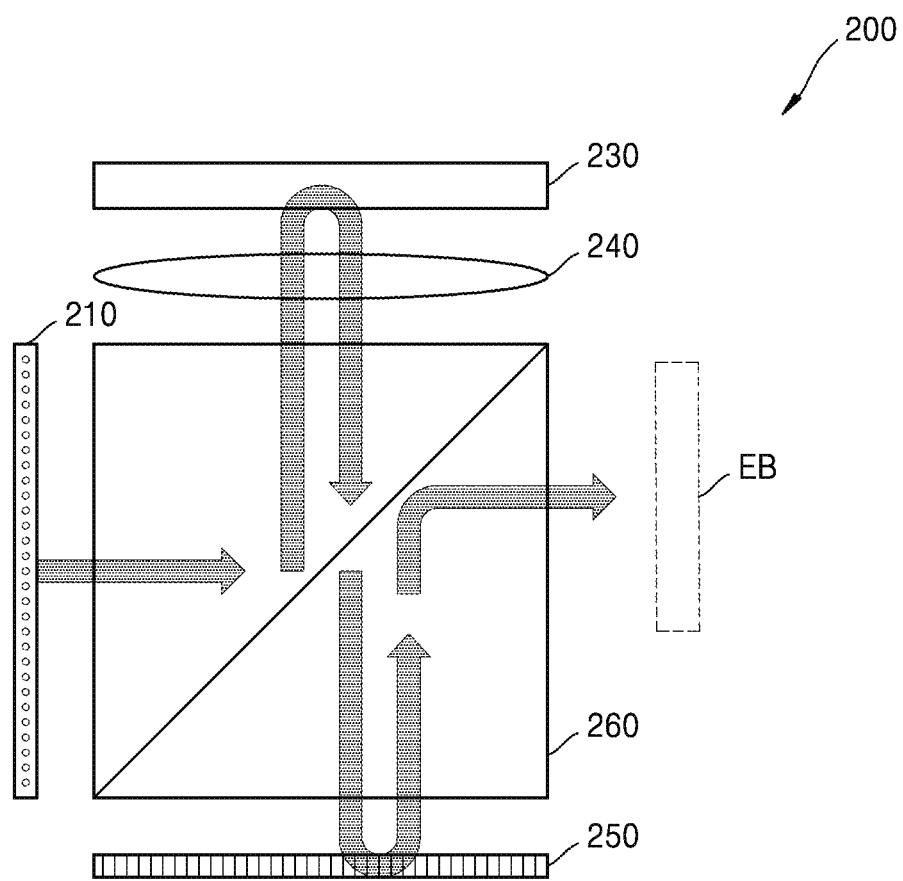
FIG. 12 is a configuration diagram illustrating an optical arrangement of a display device according to another example embodiment.

FIG. 12 is a configuration diagram illustrating an optical arrangement of a display device according to another example embodiment.

According to an example embodiment, a display device 200 may include a light source array 210, a spatial light modulator 230, a focusing lens 240, and a micro mirror array 250, and also a beam splitter 260 for transmitting the light from the light source array 210 to the spatial light modulator 230 and directing the image light formed by the spatial light modulator 230 to the micro mirror array 250.

The beam splitter 260 may be provided for a compact optical system configuration, and may be a half mirror that transmits half of the incident light and reflects the other half, or a polarization beam splitter that reflects the light of one polarized light and transmits the light of another polarized light according to the polarization of the incident light. When the beam splitter 260 is a polarization beam splitter, a quarter wave plate may further be disposed between the beam splitter 260 and the micro mirror array 250.

The light from the light source array 210 may be reflected by the beam splitter 260 and be incident on the spatial light modulator 230, and then may be modulated by the spatial light modulator 230. The spatial light modulator 230 may be of a reflective type. The image light formed in the spatial light modulator 230 may penetrate the beam splitter 260, be reflected by the micro mirror array 250, be reflected again by the beam splitter 260, and be directed toward a predetermined eye box EB. Like as the above-described embodiments, the light source array 210 may include the plurality of light sources, wherein the light source suitable for the user's pupil position among the plurality of light sources may be driven to form an expanded viewing window.

Figure 13:
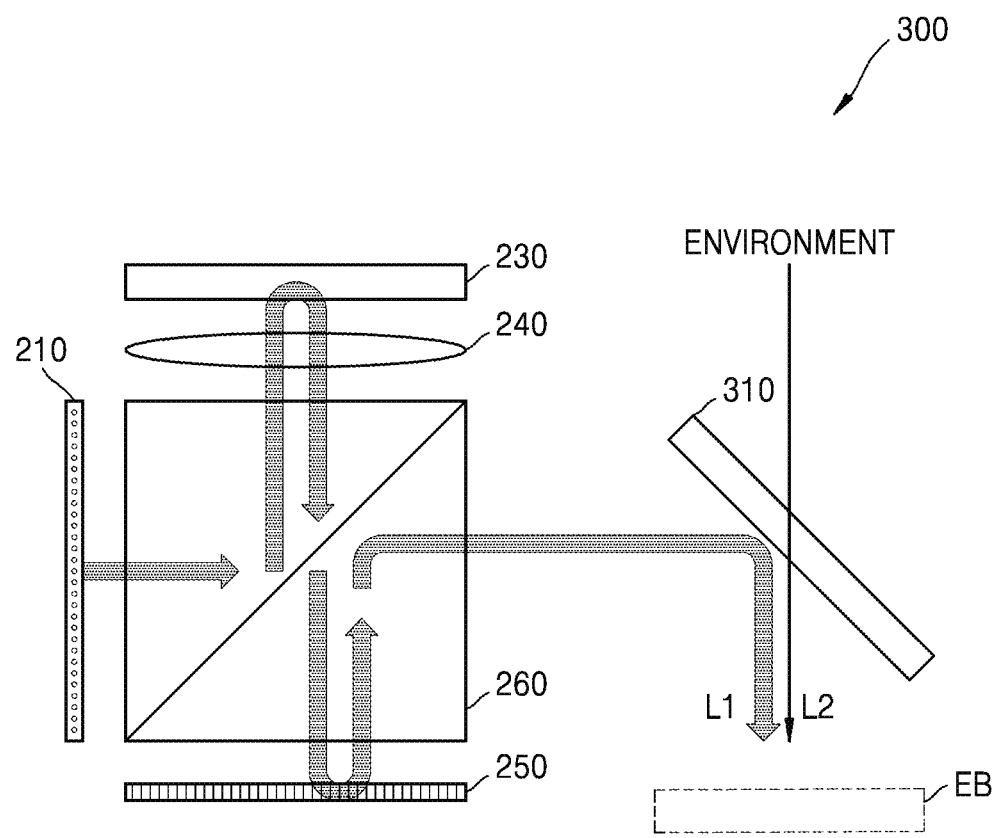
FIG. 13 is a configuration diagram illustrating an optical arrangement of a display device according to another example embodiment.

FIG. 13 is a configuration diagram illustrating an optical arrangement of a display device according to another example embodiment.

According to another example embodiment, a display device 300 may further include an optical combiner 310 in addition to the configuration of the display device 200 of FIG. 12. The optical combiner 310 may combine image light L1 that proceeds through the light source array 210, the spatial light modulator 230, and the beam splitter 260, with light L2 in an environment to be directed to the eye box EB. The optical combiner 310 may direct all the lights L1 and L2 from different directions toward the eye box EB, and various optical devices by which the image light L1 is refracted and reflected to convert a path thereof and the light L2 from the environment transmits as it is may be used. Such a display device may provide additional information combined with environment information as the image and may be used as an augmented reality device.

The display device of FIG. 13 shows that the display device of FIG. 12 is further provided with the optical combiner, but the disclosure is not limited thereto, and the display device of FIGS. 1 and 5 may be modified to have an additional optical combiner.

The above-described display devices may be configured in a wearable form. All or part of the components of the display devices may be configured in a wearable form.

Figure 14:
FIGS. 14 to 16 illustrate various electronic devices employing the display devices according to the above-described example embodiments.
Figure 15:
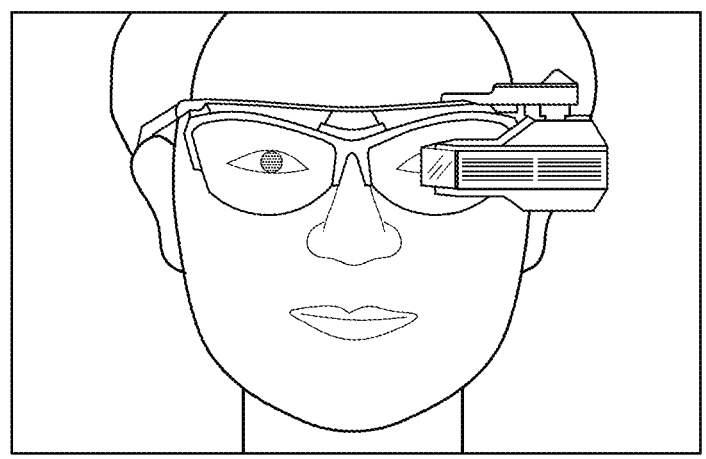
Figure 16:
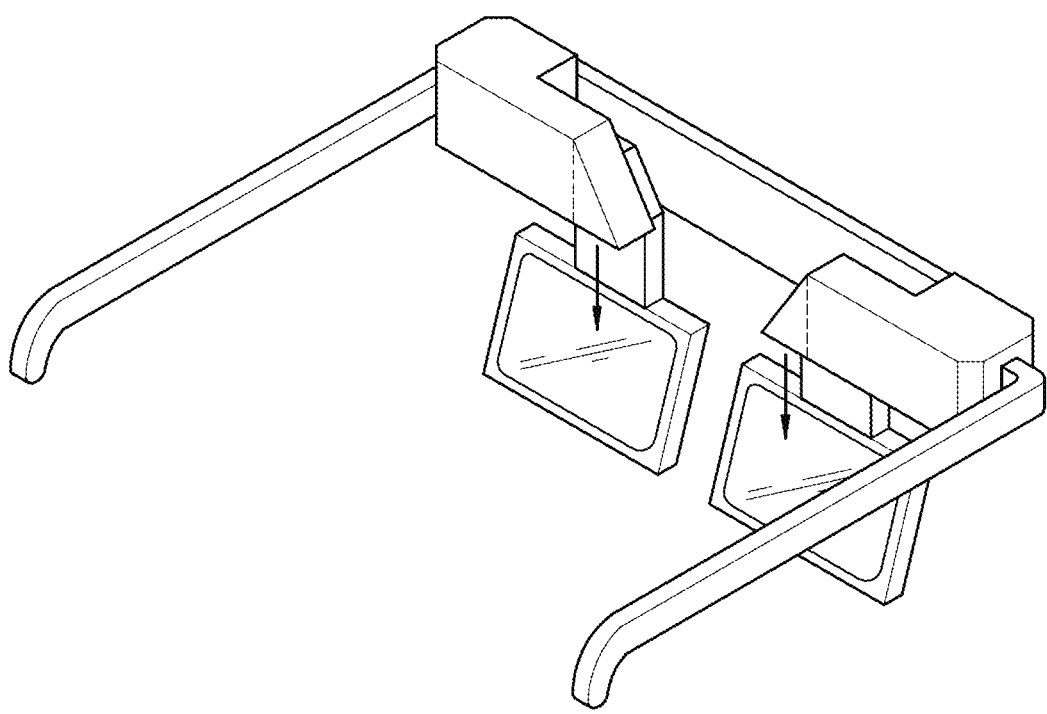

FIGS. 14 to 16 illustrate various electronic devices employing display devices according to the above-described example embodiments. As shown in FIGS. 14 to 16, the display devices may be applied to a wearable device. For example, the display devices may be applied to a head mounted display (HMD). In addition, the display devices may be applied to a glasses-type display, a goggle-type display, or the like. A wearable electronic device shown in FIGS. 14 to 16 may be operated in conjunction with a smartphone. Such display devices may include a head-mounted, a glasses-type, or a goggles-type virtual reality (VR) display device, an augmented reality (AR) display device, or a mixed reality (MR) display device.

In addition, the display device may be provided in a smartphone, and the smartphone itself may be used as the display device. In other words, the display device may be applied to a small electronic device (a mobile electronic device) other than the wearable devices as shown in FIGS. 14 to 16. In addition, the field of application of the display devices may be variously changed. For example, the display devices may be applied not only to realize VR, AR, or MR, but also to other fields. For example, the display devices may also be applied to a small television or a small monitor that the user may wear.

While example embodiments have been described and shown in the accompanying drawings to aid in understanding the disclosure, it should be understood that these example embodiments are for illustrative purposes only and are not intended to limit the disclosure. And it should be understood that the disclosure is not limited to the illustrated and described description. This is because various other modifications may occur to those of ordinary skill in the art.

According to an aspect of the disclosure, a display device may include a memory storing one or more instructions, and a processor configured to execute the one or more instructions to selectively drive at least one light source among a plurality of light sources, control a spatial light modulator to modulate the light from the at least one light source to form an image light, and control one or more mirror cells, among a plurality of mirror cells of a micro mirror array, to be in an ON state in which the image light is reflected in a first direction toward a first position that is inside of an eye box or to be in an OFF state in which the image light is reflected in a second direction toward a second position that is outside of the eye box. The micro mirror array may be arranged in an optical path formed in a focusing optical system that focuses the image light formed by the spatial light modulator at the first position in the eye box.

According to one or more example embodiment, in the display devices described above, a space in which the image may be observed, that is, the viewing window, may be widened. Thus, the user may observe the image in a wider area.

According to one or more example embodiment, because the display devices described above selectively drive only the mirror cells corresponding to the beam spot containing the image light, the display devices may provide the image with reduced noise, without an additional filter for removing noise.

According to one or more example embodiment, the display devices described above may drive only some of the mirror cells corresponding to the beam spot containing the image light, and thus provide an image with reduced speckle.

According to one or more example embodiment, the display devices described above may be applied as a wearable device, and may be used in applications such as an AR device.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A display device comprising:
a light source array comprising a plurality of light sources;
a spatial light modulator configured to modulate light from the light source array to form image light;
a focusing optical system configured to focus the image light formed by the spatial light modulator at a first position or a second position in an eye box;
a micro mirror array arranged in an optical path formed in the focusing optical system and comprising a plurality of mirror cells including a first mirror cell and a second mirror cell; and
a processor configured to:
selectively drive a first light source or a second light source among the plurality of light sources;
control the spatial light modulator to modulate the light from the first light source or the second light source to form the image light;
based on the first light source being driven, control the first mirror cell corresponding to the first light source to be in an ON state in which light incident on the first mirror cell is reflected in a first direction toward the first position that is inside of the eye box, and control the second mirror cell to be in an OFF state in which light incident on the second mirror is reflected in a second direction toward a third position that is outside of the eye box, and
based on the second light source being driven, control the second mirror cell corresponding to the second light source to be in an ON state in which light incident on the second mirror cell is reflected in a third direction toward the second position that is inside of the eye box, and control the first mirror cell to be in an OFF state in which light incident on the first mirror is reflected in a fourth direction toward a fourth position that is outside of the eye box.

2. The display device of claim 1, wherein a distance between positions at which the image light from each of the plurality of light sources is focused in the eye box is greater than or equal to a pupil size.

3. The display device of claim 1, wherein a distance between positions at which the image light from each of the plurality of light sources is focused in the eye box is in a range from 2 mm to 10 mm.

4. The display device of claim 1, wherein the plurality of light sources comprise light sources provided at different positions, and
wherein each of the plurality of light sources provide the light having a same wavelength band.

5. The display device of claim 1, wherein a distance between positions at which the image light from each of the plurality of light sources is focused in the eye box is less than a pupil size.

6. The display device of claim 5, wherein the processor is further configured to:
determine two light sources among the plurality of light sources as driving light sources,
sequentially drive the two light sources, and control the spatial light modulator in synchronization with the driving light sources.

7. The display device of claim 1, wherein
the focusing optical system comprises a first lens and a second lens that are arranged in order in the optical path from the light source array to the eye box, and
the micro mirror array is provided between the first lens and the second lens.

8. The display device of claim 7, further comprising a collimating lens provided between the light source array and the spatial light modulator.

9. The display device of claim 7, wherein the micro mirror array is provided at a fifth position of a focal plane of the first lens.

10. The display device of claim 9, wherein a size of each of the plurality of mirror cells is less than a size of a beam spot in which the image light is focused by the first lens.

11. The display device of claim 10, wherein, among the plurality of mirror cells, the processor is further configured to control M mirror cells among N mirror cells located in a region where the beam spot reaches to be in the ON state,
wherein M is a natural number less than N, and
wherein N is a natural number greater than 1.

12. The display device of claim 11, wherein the processor is further configured to:
determine a combination of a plurality of different sets of mirror cells, each of the plurality of different sets including the M mirror cells, and
sequentially control the plurality of different sets.

13. The display device of claim 1, wherein the processor is further configured to control each of the plurality of mirror cells to be in one of a plurality of ON states or the OFF state.

14. The display device of claim 1, further comprising a beam splitter provided between the light source array and the spatial light modulator, and configured to direct the light from the light source array to the spatial light modulator, and direct the image light formed by the spatial light modulator to the micro mirror array.

15. The display device of claim 14, wherein the spatial light modulator is of a reflective type.

16. The display device of claim 14, further comprising an optical combiner provided between the beam splitter and the eye box, the optical combiner configured to combine the image light formed by the spatial light modulator with the light from an environment to be directed toward the eye box.

17. The display device of claim 1, further comprising an eye tracking sensor, wherein
the processor is further configured to select a driving light source from among the plurality of light sources based on a detection signal from the eye tracking sensor.

18. The display device of claim 1, wherein the processor is further configured to select a driving light source from among the plurality of light sources according to an input from a user.

19. The display device of claim 1, wherein the display device is a wearable device.

20. A display device comprising:
a memory storing one or more instructions, and
a processor configured to execute the one or more instructions to:
selectively drive a first light source or a second light source among a plurality of light sources;
control a spatial light modulator to modulate the light from the first light source or the second light source to form an image light;
based on the first light source being driven, control a first mirror cell corresponding to the first light source, among a plurality of mirror cells of a micro mirror array, to be in an ON state in which light incident on the first mirror cell is reflected in a first direction toward a first position that is inside of an eye box, and control a second mirror cell, among a plurality of mirror cells, to be in an OFF state in which light incident on the second mirror is reflected in a second direction toward a second position that is outside of the eye box.and
based on the second light source being driven, control the second mirror cell corresponding to the second light source to be in an ON state in which light incident on the second mirror cell is reflected in a third direction toward a third position that is inside of the eye box, and control the first mirror cell to be in an OFF state in which light incident on the first mirror is reflected in a fourth direction toward a fourth position that is outside of the eye box,
wherein the micro mirror array being arranged in an optical path formed in a focusing optical system that focuses the image light formed by the spatial light modulator at the first position or the third position in the eye box.

* * * * *